US009994207B2

(12) United States Patent
Yeats et al.

(10) Patent No.: US 9,994,207 B2
(45) Date of Patent: Jun. 12, 2018

(54) AUTOLIFT-RESISTANT PISTON ASSEMBLY FOR AN UNLOADER VALVE OF AN AIR COMPRESSOR

(71) Applicant: Bendix Commercial Vehicle Systems LLC, Elyria, OH (US)

(72) Inventors: Padraig B. Yeats, Avon Lake, OH (US); Jeffrey M. Geither, North Ridgeville, OH (US); Shane A. Harte, Westlake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 350 days.

(21) Appl. No.: 14/820,655

(22) Filed: Aug. 7, 2015

(65) Prior Publication Data

US 2017/0037843 A1 Feb. 9, 2017

(51) Int. Cl.
| | | |
|---|---|---|
| *B60T 17/02* | (2006.01) | |
| *F04B 39/12* | (2006.01) | |
| *F04B 39/10* | (2006.01) | |
| *F04B 49/03* | (2006.01) | |

(52) U.S. Cl.
CPC .............. *B60T 17/02* (2013.01); *F04B 39/10* (2013.01); *F04B 39/123* (2013.01); *F04B 39/1013* (2013.01); *F04B 49/03* (2013.01)

(58) Field of Classification Search
CPC .... F16K 31/13; F16K 31/1221; F16K 31/122; F16K 31/1228; B60T 17/02; F04B 39/10; F04B 39/123; F04B 49/03; F04B 39/1013

USPC .............. 137/536, 540, 542, 543.13, 543.15, 137/543.17, 543.23, 494, 488, 529; 251/324–325, 63, 63.5, 344, 347, 62–63.6

See application file for complete search history.

(56) References Cited

U.S. PATENT DOCUMENTS

| | | | | |
|---|---|---|---|---|
| 598,283 | A * | 2/1898 | Christensen | F04B 49/243 417/298 |
| 1,229,726 | A * | 6/1917 | Ebliing | G05D 16/163 137/489.5 |
| 1,931,833 | A * | 10/1933 | Sparacino | F04B 39/041 184/18 |
| 1,962,072 | A * | 6/1934 | Haight | F04B 49/03 251/63.6 |

(Continued)

OTHER PUBLICATIONS

Bendix Commercial Vehicle Systems LLC, "SD-01-690 Bendix BA-921 Compressor: Standard and Closed Room," Service Data Sheet, Oct. 2007, 40 pages, Bendix Commercial Vehicle Systems, Elyria Ohio, USA.

*Primary Examiner* — Dominick L Plakkoottam
*Assistant Examiner* — Benjamin Doyle
(74) *Attorney, Agent, or Firm* — Cheryl L. Greenly; Brian E. Kondas; Eugene E. Clair

(57) ABSTRACT

An autolift-resistant piston assembly is provided for an air compressor. The piston assembly comprises an unloader piston having an interior chamber. The piston assembly further comprises a first coil spring for biasing the unloader piston to a loaded position when the piston assembly is installed in the air compressor. The piston assembly also comprises an inner member disposed in the interior chamber of the unloader piston and including (i) a body portion, and (ii) a tapered end portion extending from the body portion and facing an unloader air passage of the air compressor when the piston assembly is installed in the air compressor.

11 Claims, 3 Drawing Sheets

(56) References Cited

U.S. PATENT DOCUMENTS

| | | | | |
|---|---|---|---|---|
| 2,010,129 A | * | 8/1935 | Baker | F04B 49/16 251/129.03 |
| 2,052,168 A | * | 8/1936 | Crittenden | F04B 27/00 417/282 |
| 2,479,359 A | * | 8/1949 | Holt | F04B 49/06 137/115.19 |
| 2,642,887 A | * | 6/1953 | Renick | F15B 1/027 137/115.19 |
| 2,717,612 A | * | 9/1955 | Afileck | B60T 17/02 137/102 |
| 2,805,038 A | * | 9/1957 | Towler | F15B 13/02 251/28 |
| 2,973,133 A | * | 2/1961 | Newton | F04B 49/03 417/278 |
| 3,002,520 A | * | 10/1961 | Morse | B60T 15/18 137/102 |
| 3,043,495 A | * | 7/1962 | Hewitt | F02D 29/04 417/20 |
| 3,090,312 A | * | 5/1963 | Budzich | F04B 1/143 417/289 |
| 3,097,665 A | * | 7/1963 | Gauldie | F16K 17/105 137/491 |
| 3,299,832 A | * | 1/1967 | Milne | A01C 23/002 251/63.6 |
| 3,316,926 A | * | 5/1967 | Worth | F16K 17/044 137/102 |
| 3,375,844 A | * | 4/1968 | Mercier | F15B 1/027 137/115.19 |
| 3,593,959 A | * | 7/1971 | Greene | F16K 31/1221 251/63.6 |
| 3,834,837 A | * | 9/1974 | Nickell | F04B 39/125 137/102 |
| 3,888,603 A | * | 6/1975 | Nagase | F04B 49/022 417/25 |
| 3,915,597 A | | 10/1975 | Grant | |
| 4,007,906 A | * | 2/1977 | Karpenko | F16B 37/043 251/203 |
| 4,321,940 A | | 3/1982 | Krechel | |
| 4,362,475 A | * | 12/1982 | Seitz | F04B 39/08 251/63.6 |
| 4,418,709 A | * | 12/1983 | Hirsch | G05D 16/166 137/115.16 |
| 4,447,193 A | | 5/1984 | Bunn | |
| 4,473,093 A | * | 9/1984 | Hart | F04B 39/08 137/522 |
| 4,768,542 A | * | 9/1988 | Morris | F16T 1/14 137/204 |
| 4,778,351 A | * | 10/1988 | Sowards | F04B 49/243 251/62 |
| 4,993,922 A | * | 2/1991 | Lauterbach | B60T 17/004 417/279 |
| 5,149,254 A | | 9/1992 | Riffe | |
| 5,694,965 A | * | 12/1997 | Roulet | G05D 16/10 137/102 |
| 6,131,876 A | * | 10/2000 | Metzger | F16K 31/12 251/63.6 |
| 6,431,210 B1 | * | 8/2002 | Lowe | F04B 39/102 137/599.18 |
| 6,971,404 B2 | * | 12/2005 | Simmons, Jr. | B60T 17/22 137/533.19 |
| 7,086,841 B2 | * | 8/2006 | Cornwell | F04B 39/10 137/492.5 |
| 9,671,796 B2 | * | 6/2017 | Minato | G05D 16/106 |
| 2010/0025601 A1 | * | 2/2010 | Francini | F04B 39/1013 251/63.6 |
| 2010/0158709 A1 | * | 6/2010 | Bassett | F04B 49/03 417/307 |
| 2012/0318388 A1 | * | 12/2012 | Du | F16K 1/446 137/614.21 |
| 2014/0322043 A1 | | 10/2014 | Nagura | |
| 2015/0285392 A1 | * | 10/2015 | Hunt | F16K 31/1221 137/1 |
| 2017/0037843 A1 | * | 2/2017 | Yeats | B60T 17/02 |

\* cited by examiner

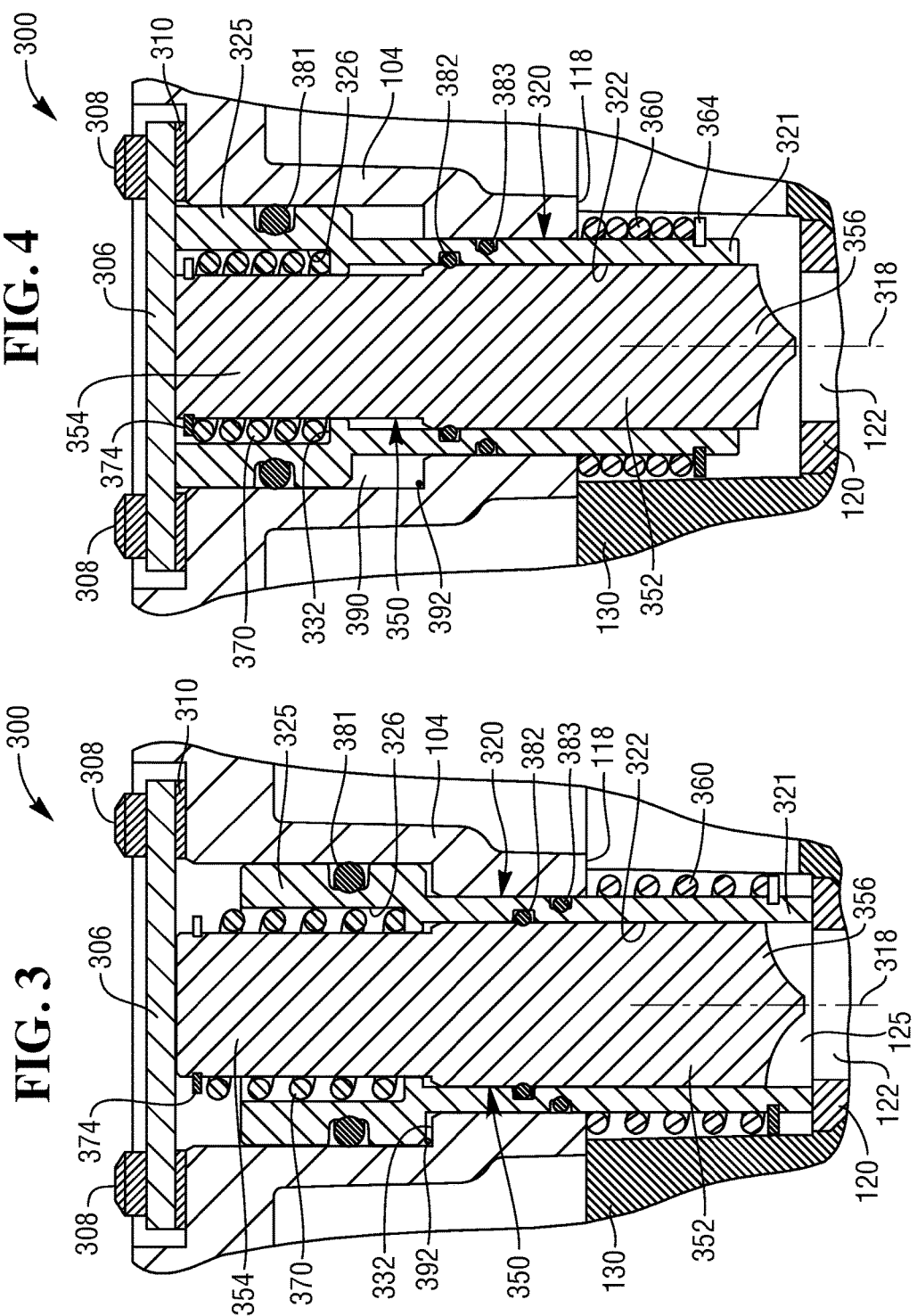

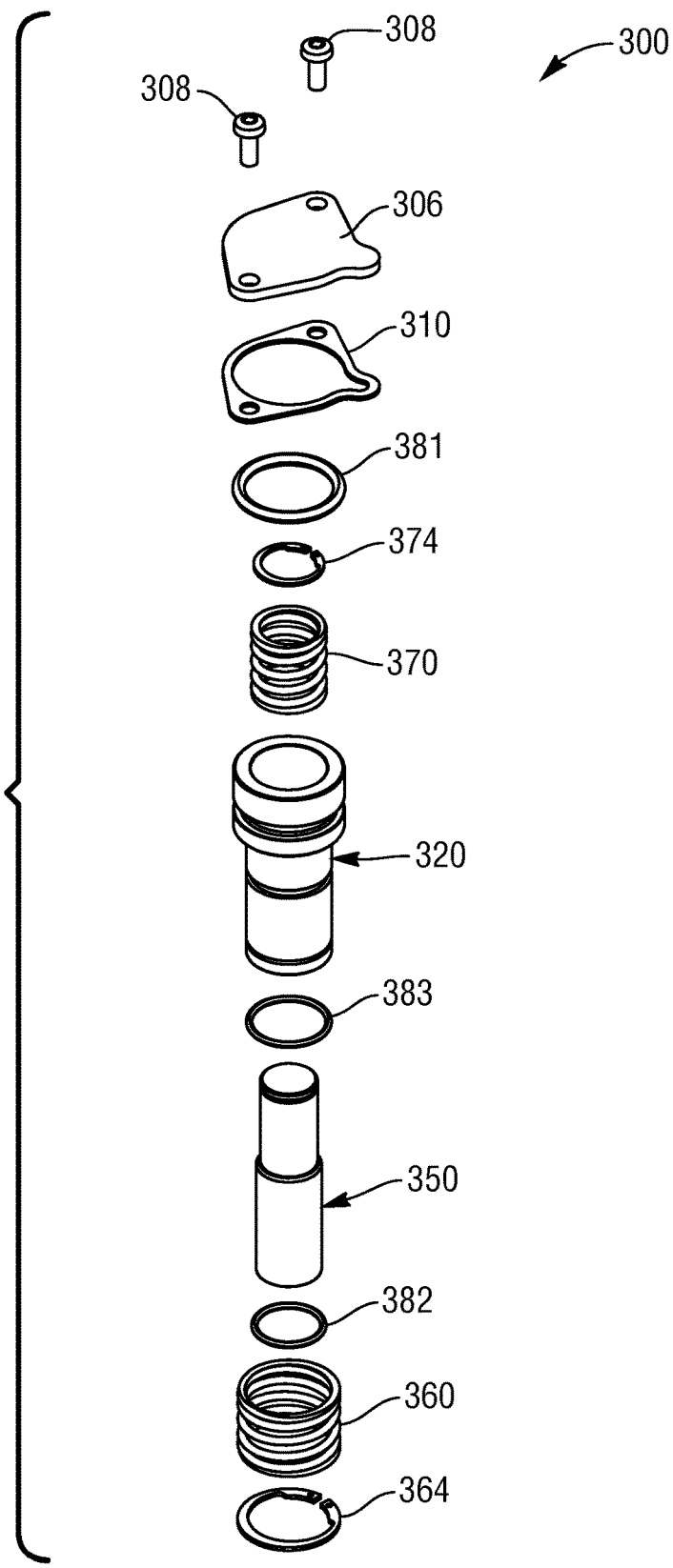

AUTOLIFT-RESISTANT PISTON ASSEMBLY FOR AN UNLOADER VALVE OF AN AIR COMPRESSOR

BACKGROUND

The present application relates to unloader valves of air compressors, and is particularly directed to an autolift-resistant piston assembly for an unloader valve of an air compressor such as a vehicle air compressor used in an air braking system of a heavy vehicle like a truck.

A truck air braking system includes a vehicle air compressor which builds air pressure for the air braking system. A governor controls system air pressure between a preset maximum pressure level and a minimum pressure level by monitoring the air pressure in a supply reservoir. When the supply reservoir air pressure becomes greater than that of a preset "cut-out" setting of the governor, the governor controls the compressor to stop the compressor from building air. As the supply reservoir air pressure drops to a preset "cut-in" setting of the governor, the governor returns the compressor back to building air.

The vehicle air compressor is typically a reciprocating air compressor and runs continuously. The compressor runs either in a loaded mode or an unloaded mode. When the compressor is running in the loaded mode, compressed air is delivered to the air braking system. When the compressor is running in the unloaded mode, compressed air is directed to an alternate place which is other than the air braking system. Also, when the compressor is running in the unloaded mode, an unloader valve releases pressurized air building up inside the compressor to reduce the pressurized air in the compressor, which in turn reduces the load on the device driving the compressor. This minimizes power consumption during operation of the compressor in the unloaded mode.

One type of unloader valve includes an unloader piston having an interior chamber into which compressed air flows during a compression stroke of the air compressor. More specifically, compressed air flows from cylinder bore of the compressor into the interior chamber of the unloader piston to move the unloader piston from an unloaded position to a loaded position in response to an air signal from the governor. The movement of compressed air flow from the cylinder bore of the compressor into the interior chamber of the unloader piston takes a finite amount of time, resulting in a pressure differential between the interior chamber of the unloader piston and the cylinder bore of the compressor. In some unloader valves, springs and balancing air forces are needed to hold the unloader piston in the loaded position to minimize any movement not initiated by the air signal from the governor.

The pressure differential between the interior chamber of the unloader piston and the cylinder bore of the compressor results in an opening force which opposes the biasing force of a coil spring. The biasing force of the coil spring biases the unloader piston toward the loaded position. Thus, the opening force opposing the biasing force of the coil spring pushes the unloader piston away from the loaded position towards the unloaded position.

An unloader piston autolifts when the cylinder pressure provides greater force upward than the spring force downward. Autolifting of the unloader piston (which can occur up to 50 times per second) results in rapid wear of O-rings which are disposed on the unloader piston. Moreover, autolifting of the unloader piston results in substantial reduction of compressed air flow to the interior chamber of the unloader piston.

One way to reduce autolifting of the unloader piston is to equalize pressure (i.e., eliminate the pressure differential) between the interior chamber of the unloader piston and the cylinder bore of the compressor by increasing the diameter of a breathing hole (a.k.a. a piston breathing hole) which communicates between the interior chamber of the unloader piston and the cylinder bore of the compressor. However, the increase in diameter of the breathing hole reduces compressor efficiency. It would be desirable to provide an unloader valve which overcomes drawbacks of known unloader valves.

SUMMARY

In accordance with one embodiment, an autolift-resistant piston assembly is provided for an air compressor. The piston assembly comprises an unloader piston having an interior chamber. The piston assembly further comprises a first coil spring for biasing the unloader piston to a loaded position when the piston assembly is installed in the air compressor. The piston assembly also comprises an inner member disposed in the interior chamber of the unloader piston and including (i) a body portion, and (ii) a tapered end portion extending from the body portion and facing an unloader air passage of the air compressor when the piston assembly is installed in the air compressor.

In accordance with another embodiment, an unloader valve apparatus is provided for an air compressor. The unloader valve apparatus comprises an unloader piston having a longitudinal central axis and movable along the longitudinal central axis between a loaded position and an unloaded position. The unloader valve apparatus further comprises an inner member between the loaded position in which the unloader piston blocks an unloader air passage and the unloaded position in which the unloader piston is not blocking the unloader air passage, wherein the unloader air passage is in fluid communication with compressed air from the air compressor. The unloader valve apparatus also comprises a first coil spring for biasing the unloader piston to the loaded position, wherein the first coil spring is unexposed to compressed air in the unloader air passage during a compression stroke of the air compressor.

In accordance with yet another embodiment, a vehicle air compressor apparatus is provided for a heavy vehicle air braking system. The vehicle air compressor apparatus comprises a compressor crankcase assembly and a compressor cylinder head assembly disposed on the crankcase assembly and co-operating with the crankcase assembly to generate compressed air. The cylinder head assembly has (i) an air inlet port through which air can be received for compression within the crankcase and cylinder head assemblies, (ii) a discharge port through which compressed air can be delivered from the cylinder head assembly, and (iii) an unloader air passage. The vehicle air compressor apparatus further comprises an unloader valve assembly connected internally of the crankcase and cylinder head assemblies and including an unloader piston defining an interior chamber and defining at least in part a control air chamber, an inner member disposed in the interior chamber of the unloader piston, and a first coil spring for biasing the unloader piston to a loaded position. The unloader piston moves from the loaded position against the biasing force of the first spring to an unloaded position when governor control air pressure is applied to the control air chamber to unload the unloader piston and thereby vent compressed air from the unloader air passage to a location which is other than the vehicle air brake system. The unloader piston moves back from the unloaded position to the loaded position under the biasing force of the first coil spring when the governor air control pressure is removed from the control air chamber.

BRIEF DESCRIPTION OF THE DRAWINGS

FIG. 3 is a sectional view, taken approximately along line 3-3 shown in FIG. 1, and showing parts of the unloader valve apparatus in a loaded position.

FIG. 4 is a sectional view similar to FIG. 3, and showing parts of the unloader valve apparatus in an unloaded position.

FIG. 5 is a perspective view, looking approximately into the page from the top of either FIG. 3 or FIG. 4, and showing parts in whole which comprise an autolift-resistant piston assembly in an exploded view.

DETAILED DESCRIPTION

Figure 2:
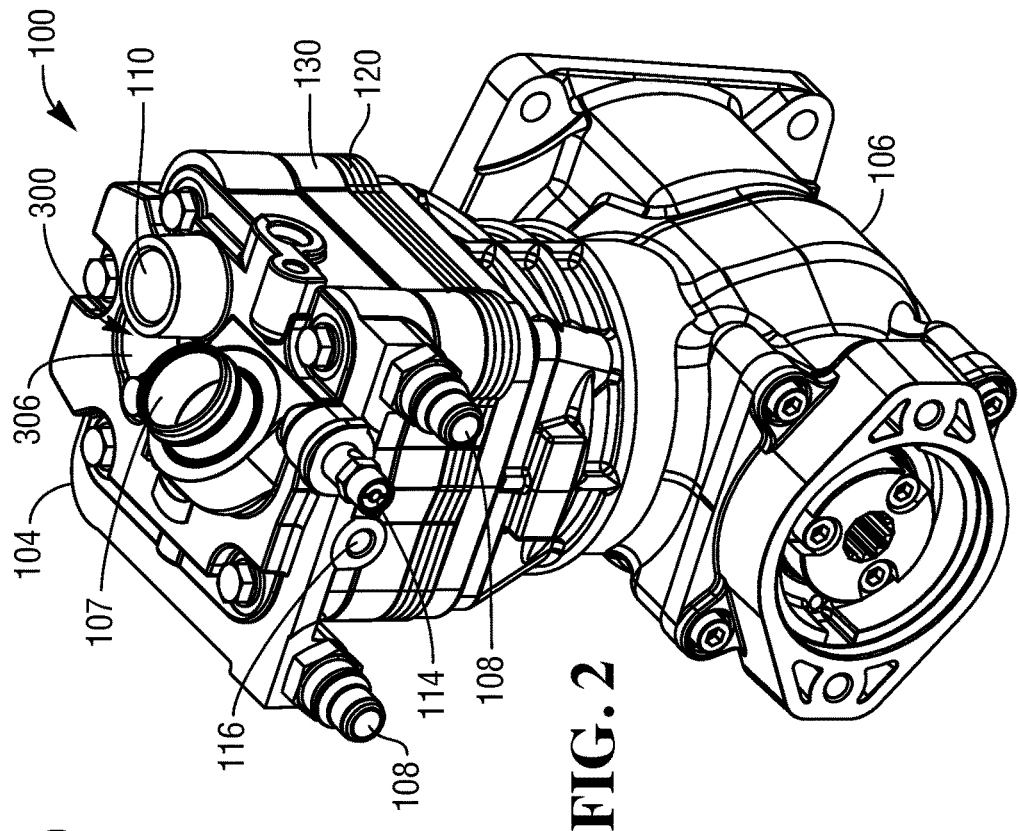
FIG. 2 is another perspective view, looking approximately in the direction of arrow "A" shown in FIG. 1, of the vehicle air compressor.
Figure 1:
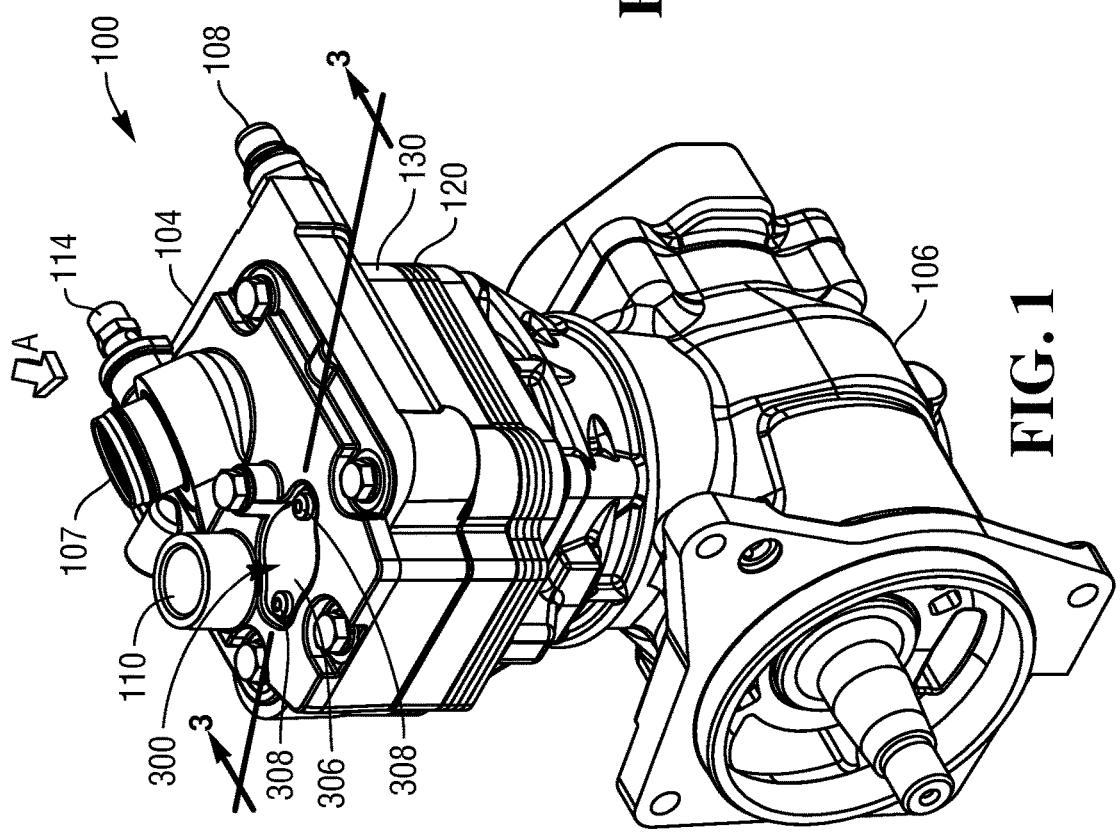
FIG. 1 is a perspective view of a vehicle air compressor including an unloader valve apparatus constructed in accordance with an embodiment.

Referring to FIGS. 1 and 2, air compressor 100 includes compressor cylinder head assembly 104 disposed on compressor crankcase assembly 106 in known manner. Components of crankcase assembly 106 and components of cylinder head assembly 104 co-operate together to generate compressed air. Compressor 100 may be based on design of a Bendix® BA-921® Compressor commercially available from Bendix Commercial Vehicle Systems LLC located in Elyria, Ohio.

Cylinder head assembly 104 includes air inlet port 107 through which air can be received for compression within crankcase assembly 106 and cylinder head assembly 104. Cylinder head assembly 104 includes discharge port 110 (i.e., an air outlet port) through which compressed air can be delivered from cylinder head assembly 104. A pair of coolant ports 108 is provided through which coolant can flow to cool cylinder head assembly 104 as compressed air is being generated. Cylinder head assembly 104 further includes safety valve port 114, and governor port 116 (shown only in FIG. 2) which is connectable via a pneumatic control line (not shown) to a governor (also not shown).

Compressor 100 further includes unloader valve assembly 300 which is disposed between crankcase assembly 106 and cylinder head assembly 104. Unloader valve assembly 300 is located next to valve plate 120 which adjoins crankcase assembly 106 and cooling plate 130 which adjoins cylinder head assembly 104 and is on valve plate 120. Cover plate 306 is fastened to cylinder head assembly 104 with a pair of fasteners, such as screws 308. Gasket 310 (see FIGS. 3 and 4) is disposed between cover plate 306 and cylinder head assembly 104 to provide a seal therebetween.

FIG. 3 is a sectional view taken approximately along line 3-3 shown in FIG. 1. FIG. 3 shows parts of unloader valve assembly 300 in a loaded position. FIG. 4 is a sectional view is similar to FIG. 3, and shows parts of the unloader valve apparatus in an unloaded position. FIG. 5 is a perspective view, looking approximately into the page from the top of either FIG. 3 or FIG. 4. The perspective view of FIG. 5 shows parts in whole which comprise autolift-resistant piston assembly 300 in an exploded view.

Referring to FIGS. 3-5, unloader valve assembly 300 includes generally cylindrical unloader piston 320. Unloader piston 320 has longitudinal central axis 318, and is movable along longitudinal central axis 318 between a seated position (shown in FIG. 3 and which corresponds to compressor 100 running in loaded mode) and an unseated position on valve plate 120 (shown in FIG. 4 and which corresponds to compressor 100 running in unloaded mode).

Unloader piston 320 has first end portion 321 having first bore 322 which defines first chamber and second end portion 325 having second bore 326 which defines second chamber. First bore 322 has smaller diameter than second bore 326. Diameter of first bore 322 of unloader piston 320 is equal to, or greater than, diameter of unloader air passage 122 in valve plate 120.

First end portion 321 of unloader piston 320 extends into central opening of coil spring 360. Coil spring 360 preferably has a ratio of length to diameter below four. Snap ring 364 is disposed on a first outer circumferential surface of unloader piston 320 at a location which maintains coil spring 360 compressed between snap ring 364 and bearing surface 118 of cylinder head assembly 104 when unloader valve assembly 300 is installed in compressor 100 as shown in FIGS. 1 and 2. Material of unloader piston 320 may comprise any type of material. For example, unloader piston 320 may comprise a metallic material such as carbon steel.

Unloader valve assembly 300 further includes inner member 350 may be a solid body. Inner member 350 includes first body portion 352, second body portion 354 which extends from first body portion 352, and tapered end portion 356 which extends from first body portion 352. Tapered end portion 356 of inner member 350 may comprise a curved surface originating from a raised vertex, and may have a concave face surrounding a point such as shown in FIGS. 3 and 4. In one example, second body portion 354 may be secured to cover plate 306 and may have a slightly smaller outer diameter than outer diameter of first body portion 352. Material of inner member 350 may comprise any type of material. For example, inner member 350 may comprise a metallic material such as carbon steel.

First body portion 352 of inner member 350 extends into first chamber defined by unloader piston 320. Second body portion 354 of inner member 350 extends into central opening of coil spring 370. Coil spring 370 is preferably has a ratio of length to diameter below four. Snap ring 374 is disposed on outer circumferential surface of inner member 350 at a location which maintains coil spring 370 compressed between snap ring 374 and inner circumferential lip surface 332 of unloader piston 320.

Third chamber 390 (best shown in FIG. 4) is a control air chamber defined between unloader piston 320 and cylinder head assembly 104. Third chamber 390 provides a volume space into which control signal air pressure from governor (not shown) flows to push unloader piston 320 upward from the seated position (i.e., the loaded mode of compressor 100) shown in FIG. 3 towards the unseated position (i.e., the unloaded mode of compressor 100) shown in FIG. 4. More specifically, control signal air pressure from governor is applied through passage 392 to create sufficient air pressure in third chamber 390 to push unloader piston 320 from the loaded position shown in FIG. 3 to the unloaded position shown in FIG. 4.

A first seal, such as first O-ring 381, is disposed in a seal cavity disposed in a second outer circumferential surface of unloader piston 320. First O-ring 381 provides an air-tight seal between the second outer circumferential surface of unloader piston 320 and a first inner diameter bearing surface of cylinder head assembly 104 of compressor 100. First O-ring 381 provides an air-tight seal to support up-anddown movement of unloader piston 320 relative to the first inner diameter bearing surface of cylinder head assembly 104 of compressor 100.

A second seal, such as second O-ring 382, is disposed in another seal cavity disposed in an inner circumferential surface of unloader piston 320. Second O-ring 382 provides an air-tight seal between the inner circumferential surface of unloader piston 320 and an outer circumferential surface of first body portion 352 of inner member 350.

A third seal, such as third O-ring 383, is disposed in yet another seal cavity disposed in the first outer circumferential surface of unloader piston 320. Third O-ring 383 provides an air-tight seal between the first outer circumferential surface of unloader piston 320 and a second inner diameter bearing surface of cylinder head assembly 104 of compressor 100. First and third O-rings 381, 383 provide an air-tight seal to support up-and-down movement of unloader piston 320 relative to body of cylinder head assembly 104 of compressor 100.

Autolift-resistant piston assembly 300 shown in FIG. 5 comprises a combination of components. The combination of components includes unloader piston 320, inner member 350, coil springs 360, 370, snap rings 364, 374, and O-rings 381, 382, 383.

When compressor 100 is running in loaded mode, unloader piston 320 is in the seated position shown in FIG. 3. A dead volume space 125 is defined in the vicinity of tapered end portion 356 of inner member 350 when unloader piston 320 is in the seated position shown in FIG. 3. When compressor 100 is running in unloaded mode, unloader piston 320 is in an unseated position such as shown in FIG. 4. The seated position of unloader piston 320 shown in FIG. 3 will be referred to as the loaded position, the loaded mode, or the blocking position. The unseated position of unloader piston 320 shown in FIG. 4 will be referred to as the unloaded position, the unblocking position, or the non-blocking position.

During operation of unloader valve assembly 300, unloader piston 320 is responsive to a control signal air pressure from governor port of governor (not shown). Unloader piston 320 moves from the seated position shown in FIG. 3 to the unseated position shown in FIG. 4 in response to the control signal air pressure being applied through passage 392 into third chamber 390. As unloader piston 320 moves from the loaded position of FIG. 3 to the unloaded position of FIG. 4, compressed air from unloader air passage 122 in valve plate 120 flows against tapered end portion 356 of inner member 350.

Tapered end portion 356 aerodynamically deflects compressed air flow from unloader air passage 122 which is in fluid communication with compressed air from compressor 100. This deflected air is vented to a location which is other than the vehicle air brake system to release pressure building up inside compressor 100. For example, the deflected air may be vented to atmosphere. When pressure inside cylinder bore of compressor 100 is released, the load on the device driving compressor 100 is reduced. Unloader piston 320 returns from the unseated position shown in FIG. 4 to the seated position shown in FIG. 3 when the control signal air pressure from governor is removed.

It should be apparent that neither coil spring 360 nor coil spring 370 is in the air flow path from unloader air passage 122 through unloader valve assembly 300. Neither of coil springs 360, 370 is exposed to compressed air in unloader air passage 122. As such, each of coil springs 360, 370 is disposed in a relatively cool environment during operation of unloader valve assembly 300. This allows each of coil springs 360, 370 to operate at a location further from a location of high operating temperatures. The results are reduced spring set, less spring force which acts on cover plate 306, longer spring life, and spring designs which can operate at relatively higher stresses. Accordingly, less governor control signal air pressure is needed to fully lift unloader piston 320 against the biasing force of coil springs 360, 370.

Since each of coil springs 360, 370 has a ratio of length to diameter below four, spring buckling is eliminated. This results in elimination of side loading (i.e., a sideways force) that spring buckling causes along with elimination of premature O-ring wear associated with it. Moreover, since each coil spring is not in the air flow path from unloader air passage 122, "breathing" of unloader piston 320 is not impacted.

It should be apparent that O-rings 381, 382, 383 are closer to coolant channels and farther away from the relatively higher cylinder bore temperatures of compressor 100. As such, each of O-rings 381, 382, 383 is disposed in a lower operating temperature environment, resulting in longer O-ring life.

It should also be apparent that unloader piston 320 has no bottom face which is in the air flow path from unloader air passage 122. This feature eliminates autolifting of unloader piston 320 during loaded mode operation of compressor 100, and thus minimizes power requirements during unloaded mode operation of compressor 100. Unloader piston 320 is unable to autolift and moves only when control signal air pressure from governor is applied through passage 392 to third chamber 390. Since unloader piston 320 is unable to autolift, there is no need for a breathing hole to equalize pressure between unloader air passage 122 and interior chambers of unloader piston 320.

It should further be apparent that inner member 350 is stationary and fills the inner diameter of unloader piston 320 to reduce dead volume space during loaded mode operation of compressor 100. The reduced dead volume increases delivered air flow and thereby allows compressor 100 to run more efficiently during loaded mode operation. Inner member 350 also supports the spring force of coil springs 360, 370, the sealing of O-rings 381, 382, 383, and the directing of the flow of compressed air.

Moreover, since tapered end portion 356 of inner member 350 has a concave face which facilitates air flow, inner member 350 offers little or no resistance to air being shuttled back and forth during unloaded mode operation of compressor 100. The shape of tapered end portion 356 can be optimized to minimize air resistance during unloaded mode operation of compressor 100. Accordingly, power requirements required to operate the device which drives compressor 100 are reduced during unloaded mode operation of compressor 100.

Autolift-resistant piston assembly 300 shown in FIG. 5 can be easily retrofitted to existing unloader valve assemblies which do not have either an inner member having a tapered end portion or an unloader piston which is unable to be autolifted. The result is longer periods of time between when servicing or replacement of parts is needed for retrofitted unloader valve assemblies as well as newly manufactured unloader valve assemblies.

Although the above-description describes two coil springs 360, 370 being used to bias unloader piston 320 to the loaded position, it is conceivable that only one of coil springs 360, 370 be used.

Although the above-description describes inner member 350 having a tapered end portion shape as best shown in FIGS. 3 and 4, it is conceivable that inner member 350 may have a different tapered end portion shape. The tapered end portion shape may be any shape from a straight line to an arcuate curve. Moreover, although the above-description describes inner member 350 being a solid body, it is conceivable that a portion of the central part of the solid body of inner member 350 be hollowed out to save on material and weight, while not communicating with the compressed air.

Also, although the above-description describes a particular commercially-available model of compressor which has been modified to provide the above-described embodiment, it is conceivable that a new compressor can be manufactured to provide results described hereinabove.

Further, although the above-description describes unloader valve assembly 300 being used in a heavy vehicle such as a truck, it is conceivable that unloader valve assembly 300 may be used in other types of commercial vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An autolift-resistant piston assembly for an air compressor, the autolift-resistant piston assembly comprising:
   an unloader piston having an interior chamber;
   a first coil spring for biasing the unloader piston to a loaded position when the autolift-resistant piston assembly is installed in the air compressor; and
   an inner member disposed in the interior chamber of the unloader piston and including (i) a body portion, and (ii) a tapered end portion extending from the body portion and facing an unloader air passage of the air compressor when the autolift-resistant piston assembly is installed in the air compressor; wherein the tapered end portion of the inner member comprises a curved surface having a concave face originating from a raised vertex.

2. The autolift-resistant piston assembly according to claim 1, wherein the first coil spring is disposed between an inner circumferential surface of the unloader piston and an outer circumferential surface of the inner member.

3. The autolift-resistant piston assembly according to claim 1, further comprising:
   a snap ring disposed on an end portion of the inner member and for maintaining the first coil spring compressed between the snap ring and an inner circumferential lip surface of the unloader piston.

4. The autolift-resistant piston assembly according to claim 1, further comprising:
   a second coil spring separate from the first coil spring, wherein (i) the first coil spring is disposed between an inner circumferential surface of the unloader piston and an outer circumferential surface of the inner member, and (ii) the second coil spring is disposed on an outer circumferential surface of the unloader piston.

5. The autolift-resistant piston assembly according to claim 4, further comprising:
   a first snap ring disposed on an end portion of the inner member and for maintaining the first coil spring compressed between the first snap ring and an inner circumferential lip surface of the unloader piston; and
   a second snap ring disposed on an end portion of the unloader piston and for maintaining the second coil spring compressed between the second snap ring and a cylinder head bearing surface of the air compressor.

6. An unloader valve apparatus for an air compressor, the unloader valve apparatus comprising:
   an unloader piston having a longitudinal central axis and movable along the longitudinal central axis between a loaded position and an unloaded position;
   an inner member extending into the unloader piston;
   wherein the unloader piston is movable between the loaded position in which the unloader piston blocks an unloader air passage and the unloaded position in which the unloader piston is not blocking the unloader air passage, wherein the unloader air passage is in fluid communication with compressed air from the air compressor;
   a first coil spring for biasing the unloader piston to the loaded position, wherein the first coil spring is separated from compressed air in the unloader air passage during a compression stroke of the air compressor; and
   a second coil spring separate from the first coil spring and for biasing the unloader piston to the loaded position, wherein the second coil spring is separated from compressed air in the unloader air passage when the unloader piston is in the loaded position.

7. The unloader valve apparatus according to claim 6, wherein (i) the first coil spring is disposed between an inner circumferential surface of the unloader piston and an outer circumferential surface of the inner member, and (ii) the second coil spring is disposed on an outer circumferential surface of the unloader piston.

8. The unloader valve apparatus according to claim 7, further comprising:
   a first snap ring disposed on an end portion of the inner member and for maintaining the first coil spring compressed between the first snap ring and an inner circumferential lip surface of the unloader piston; and
   a second snap ring disposed on an end portion of the unloader piston and for maintaining the second coil spring compressed between the second snap ring and a cylinder head bearing surface of the air compressor.

9. The unloader valve apparatus according to claim 7, wherein the inner member includes (i) a body portion, and (ii) a tapered end portion extending from the body portion and facing the unloader air passage.

10. A vehicle air compressor apparatus for a heavy vehicle air braking system, the vehicle air compressor apparatus comprising: a compressor crankcase assembly; a compressor cylinder head assembly disposed on the compressor crankcase assembly and co-operating with the compressor crankcase assembly to generate compressed air, wherein the compressor cylinder head assembly has (i) an air inlet port through which air can be received for compression within the compressor crankcase and compressor cylinder head assemblies, (ii) a discharge port through which compressed air can be delivered from the compressor cylinder head assembly, and (iii) an unloader air passage; and an unloader valve assembly connected internally of the compressor crankcase and compressor cylinder head assemblies and including: an unloader piston defining an interior chamber and defining at least in part a control air chamber; an inner member disposed in the interior chamber of the unloader piston; a first coil spring for biasing the unloader piston to a loaded position, wherein (i) the unloader piston moves from the loaded position against a biasing force of the first coil spring to an unloaded position when a governor control air pressure is applied to the control air chamber to unload the unloader piston and thereby vent compressed air from the unloader air passage to a location which is other than the heavy vehicle air braking system, and (ii) the unloader piston moves back from the unloaded position to the loaded position under the biasing force of the first coil spring when the governor control air pressure is removed from the control air chamber; wherein (i) the first coil spring is disposed between an inner circumferential surface of the unloader piston and an outer circumferential surface of the inner member, and (ii) the first coil spring is separated from compressed air in the unloader air passage during a compression stroke of the air compressor; and a second coil spring separate from the first coil spring and for biasing the unloader piston to the loaded position, wherein (i) the second coil spring is disposed on an outer circumferential surface of the unloader piston, and (ii) the second coil spring is separated from compressed air in the unloader air passage when the unloader piston is in the loaded position.

11. The vehicle air compressor apparatus according to claim 10, wherein the inner member includes (i) a body portion, and (ii) a tapered end portion extending from the body portion and facing the unloader air passage.

\* \* \* \* \*